United States Patent [19]

Bodimer

[11] Patent Number: 4,852,724
[45] Date of Patent: Aug. 1, 1989

[54] CRAWLER-MOUNTED CONVEYING TRAIN

[75] Inventor: Theodore B. Bodimer, Franklin, Pa.

[73] Assignee: Joy Manufacturing Company, Pittsburgh, Pa.

[21] Appl. No.: 832,188

[22] Filed: Feb. 24, 1986

[51] Int. Cl.⁴ ............................................. B65G 21/00
[52] U.S. Cl. ................................. 198/861.2; 198/303
[58] Field of Search .................. 198/861.2, 300, 303, 198/310, 312; 299/43, 44, 45, 46, 47, 49, 50; 305/35 R, 39, 41, 44, 54, 57, 58 R, 58 PC

[56] References Cited

U.S. PATENT DOCUMENTS

| | | | |
|---|---|---|---|
| 1,733,526 | 10/1929 | Coburn et al. | 305/57 |
| 2,250,933 | 7/1941 | Manierre | 198/303 |
| 2,722,409 | 11/1955 | Bergmann | 198/587 |
| 2,776,033 | 1/1957 | Presti | 198/300 |
| 2,798,587 | 7/1957 | Bergmann | 198/303 |
| 2,850,147 | 9/1958 | Hill | 198/303 |
| 2,955,699 | 10/1960 | Lanier, Jr. | 198/303 |
| 3,268,060 | 8/1966 | Long | 198/300 |
| 3,361,248 | 1/1968 | Daymon | 198/303 |
| 3,584,731 | 6/1971 | Dahlem | 198/303 |
| 3,701,411 | 10/1972 | McGinnis | 198/303 |
| 3,863,752 | 2/1975 | Sibley | 198/303 |
| 3,974,907 | 8/1976 | Shaw et al. | 198/303 |
| 4,031,997 | 6/1977 | Nelson | 198/303 |
| 4,061,223 | 12/1977 | McGinnis | 198/861.2 |
| 4,159,757 | 7/1979 | Kleysteuber et al. | 198/303 |
| 4,260,053 | 4/1981 | Onodera | 198/812 |
| 4,339,031 | 7/1982 | Densmore | 198/861.2 |

FOREIGN PATENT DOCUMENTS

| | | | |
|---|---|---|---|
| 838125 | 10/1983 | South Africa . | |
| 1373170 | 11/1974 | United Kingdom | 198/861.2 |

Primary Examiner—Robert J. Spar
Assistant Examiner—James R. Bidwell
Attorney, Agent, or Firm—Kirkpatrick & Lockhart

[57] ABSTRACT

A material conveying system capable of traversing a surface along an elongated path having at least one curvilinear portion. The conveyor structure includes a plurality of framework members arranged in tandem on the surface of the elongated path. There are connectors on each framework member which are cooperable with connectors on each adjacent framework member for coupling the plurality of framework members to form the train. Each framework member has a series of rails to support an upper and lower run of an orbitally moveable crawler chain which engages the surface and which chain is capable of propelling the conveyor along the surface. At least some of the framework members include support structure for supporting an orbitally moveable conveying belt above the orbitally moveable crawler chain. The conveying run of the orbitally moveable conveying belt is operable to convey material substantially throughout the entire longitudinal extent of the conveyor train either while the train is moving or is stationary.

25 Claims, 12 Drawing Sheets

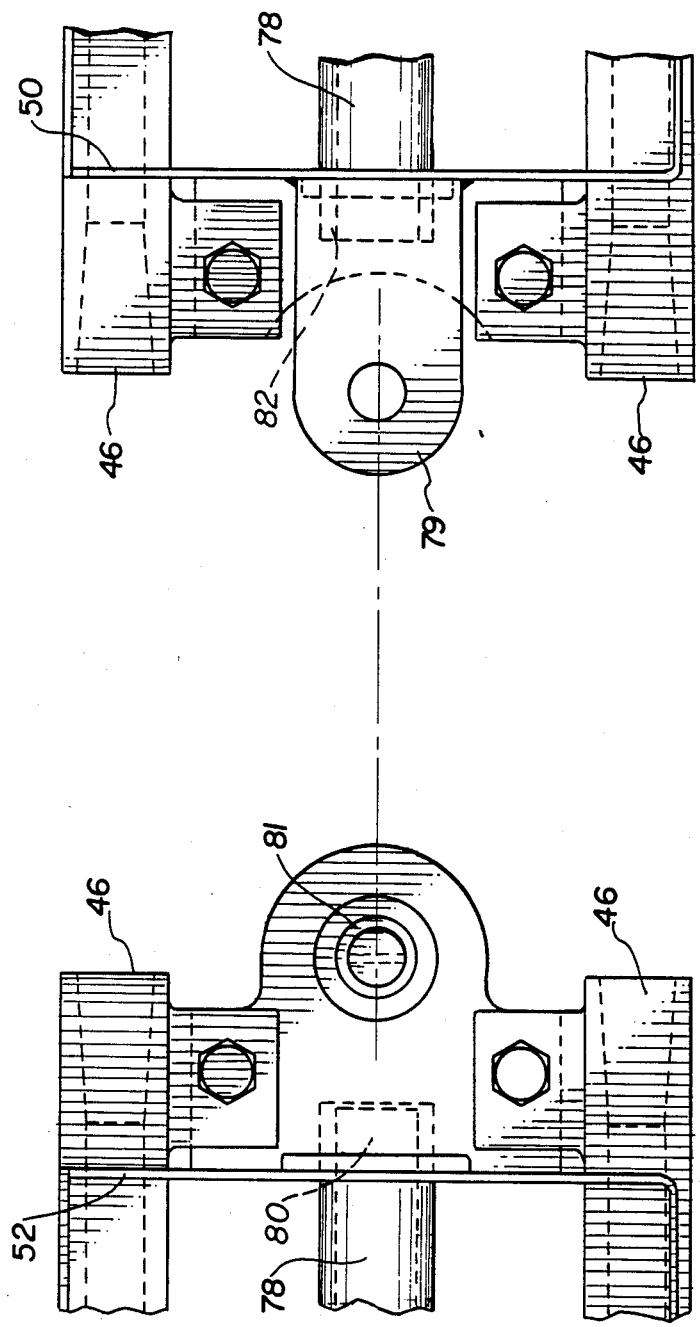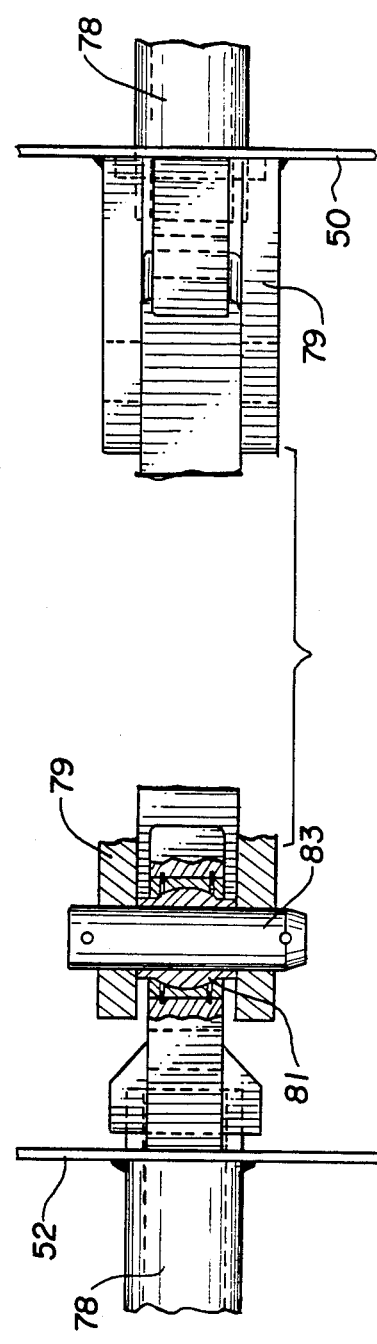
FIG. 3A
FIG. 3B

CRAWLER-MOUNTED CONVEYING TRAIN

BACKGROUND OF THE INVENTION

1. Field of the Invention

The present invention relates to conveyor systems, and more particularly, is directed to a self-propelled articulated conveyor system adapted to be driven along the mine surface by an elongated crawler chain and which conveyor system is capable of traversing curvilinear paths.

2. Description of the Prior Art

In mining operations, especially underground mining operations, such as, coal mining or the like, conveyors or series of conveyors are used to transport the mined ore from the mine. Normally, there is a main conveyor that moves the mined material along a fixed path. The main conveyor has a terminal end at a fixed location for receiving the material being mined. In the past, shuttle cars or other short distance haulage vehicles have been used to transport the mined material from the mining machine to the fixed terminal end of the main conveyor. The use of shuttle cars and other such haulage vehicles is intermittent, time consuming, and inefficient in not providing for the continuous transport of the mined materials from the mining machine to the fixed conveyor. Thus, in more recent years there have been several developments directed toward a mobile articulated conveyor that provides for continuous transport of the discharge of a continuous miner to the main conveyor as the miner advances into the mine face and changes the direction of its forward movement. Such mobile articulated conveyors are particularly adaptable to "room and pillar" type coal mining operations wherein the mobile conveyor follows the continuous miner and changes in direction as the machine penetrates into the mine face in one room and then is backed out and set to work in the mine face of another room while roof bolts are installed in the recently mined room. The mining machine is then backed out of this second room and set to work in either the recently roof-bolted room or it may go on to still another room.

One of these more recently developed mobile articulated conveyors is shown in the Payne et al patent, U.S. Pat. No. 3,707,218, and sold under the trade designation "Serpentix". The Serpentix conveyor has an endless trough shaped, accordion-pleated belt supported on a vertebrae-like member which, in turn, is supported on the mine floor by stanchions. The stanchion supported conveyor was cumbersome and did not lend itself to frequent shifting of the conveyor path from room to room. Thus, Craggs, as shown in U.S. Pat. No. 3,920,115, suspended the Serpentix conveyor from an overhead monorail and thereby provided a flexible frame conveyor which could be attached to the surge car behind a mining machine. The conveyor could now follow the mining machine as it moved from one room to another in performing its mining operation.

Another development in such mobile articulated conveyors is disclosed in McGinnis U.S. Pat. No. 3,701,411 which shows a conveyor comprised of an endless belt supported on a train of pivotally interconnected portable cars or carriages. Each of the carriages are supported on ground engaging wheels thereby providing mobility to the conveyor. A self-propelled tractor is connected to the conveyor train to move it from one location to another. Another development along the same lines can be found in U.S. Pat. No. 3,863,752.

A later McGinnis patent, U.S. Pat. No. 4,061,223, discloses a mobile articulated conveyor suspended from an overhead monorail. Shown is a U-shaped conveyor belt carried by a plurality of individual carriage units suspended from the overhead monorail. The carriage units are fastened to one another by a resilient, flexible spline member which provides for positioning of the carriage units around vertical and horizontal curves. The conveyor belt is driven by a separate power belt and guided by guide rollers.

The Assignee of Applicant's invention has obtained U.S. Pat. No. 4,339,031 which discloses a mobile monorail suspended conveyor system. While this conveying system has shown promise in higher seams of coal and other mineral mining, there is a limit to the seam height in which one can utilize a conveyor system suspended from an overhead monorail.

United Kingdom Pat. No. 1,373,170 discloses a self-propelled conveying system which can convey minerals and can move itself from one place to another after the conveying function is no longer required. As can be seen, an obvious draw back to this system is that the conveyor is not capable of continuously conveying material from the input end to the discharge end while the conveying system is being moved to another site.

SUMMARY OF THE INVENTION

The preferred embodiment of the conveyor system, as disclosed herein, includes various unique features for facilitating the transport of materials from a first location, such as an area where a continuous miner is working, to a second location, such as where the receiving end of a second conveyor is positioned, wherein the travel path defined between the first and second locations includes horizontal and/or vertical curves.

While these unique features are particularly adapted for conveying materials along a curvilinear path, such as experienced in underground mining operations, it will be readily apparent that some of such features may be incorporated, either singularly or together, into above-ground conveying systems for conveying materials either along linear or curvilinear paths, as well as for conventional above and below ground flexible conveyors and thereby improve the same.

It is, accordingly, the principal object of the present invention to provide a conveyor system with an articulated conveyor in which the aforementioned problems of the prior art have been overcome which is simple and inexpensive in structure, reliable in operation, and is so constructed to present a low-profile enabling the same to maneuver around pullers and through low-clearance passageways.

More particularly, an object of the present invention is to provide an improved articulated conveyor which is supported by the floor of a mine and which is capable of traversing a curvilinear path while maintaining the conveyor run portion of an orbital conveying belt in an operative mode.

More specifically, an object of the present invention is to provide an articulated conveyor which includes a train of framework members which support a crawler chain or crawler track in engagement with the mine surface and which cooperate with adjacent framework members to maintain the entire conveyor train in a predetermined disposition relative to an elongated path along a mine floor.

Yet another object of the present invention is to support an orbitally moveable elastomeric conveyor belt within a relatively short distance of the mine floor to permit conveyance of mined material either while the entire conveying system is in motion or is stationary with respect to the mine floor.

Still another object of the present invention is to provide a conveyor with an improved traction drive system for moving the mobile articulated conveying system along the mine floor either straight or along curvilinear paths while substantially eliminating any binding or other deleterious forces normally associated with or resulting from moving a rigid member through horizontal or vertical curved paths.

Still another object of the invention is to provide a conveyor system having a flexible track drive system capable of bending around horizontal and/or vertical curves while delineating a fixed elongated path within a mine.

Pursuant to these and other objects, the present invention sets forth a conveying system comprised of a plurality of tandemly disposed framework members that are connected to one another by an articulated joint so as to permit each framework member to move universally relative to adjacent framework members and to permit the train of framework members to be moved in unison along a curvilinear path. Each of the framework members defines an open extent extending longitudinally therethrough which includes a means for supporting an orbital conveyor belt which extends longitudinally within the open extent of the conveyor train and is located above the track or crawler chain system also mounted on the framework members.

Mounted on the respective ends of adjacent framework members are portions that form the articulated joint which thereby connects adjacent framework members and permits universal movement of one framework member relative to its tandemly disposed adjacent framework member. In the preferred embodiment, the conveyor train is supported on the lower run of the crawler chain or track assembly which is capable of driving the conveyor train along the mine surface.

Mounted on the ends of adjacent framework members are structures which cooperate with one another so as to selectively limit the longitudinal movement of adjacent framework members relative to one another during a longitudinal movement thereof. Other structures are utilized to limit horizontal, vertical and twisting movement of the framework members so as to maintain both the conveyor belt and the crawler chain assemblies in proper alignment.

The articulated conveyor system is moved along the mine surface by traction drive means located in at least one of the framework members and capable of driving the track or crawler chain assembly.

These and other advantages of the present invention will become more apparent upon reference to the following detailed specification and drawings.

DESCRIPTION OF THE DRAWINGS

In the course of the following detailed description, reference will be frequently made to the attached drawings in which:

FIG. 3a is a plan view of the coupling system between adjacent framework members.

FIG. 3b is a side elevational view of the connection system as shown in FIG. 3a.

FIG. 9 shows an end sectional view of a discharge scheme of the present invention taken along the lines 9—9 of FIG. 2a.

DETAILED DESCRIPTION OF THE PREFERRED EMBODIMENT

In the following description, it is to be understood that such terms as "forward", "rearward", "left", "right", "upward" and "downward", etc., are words of convenience and are not to be construed as limiting terms.

IN GENERAL

Figure 1:
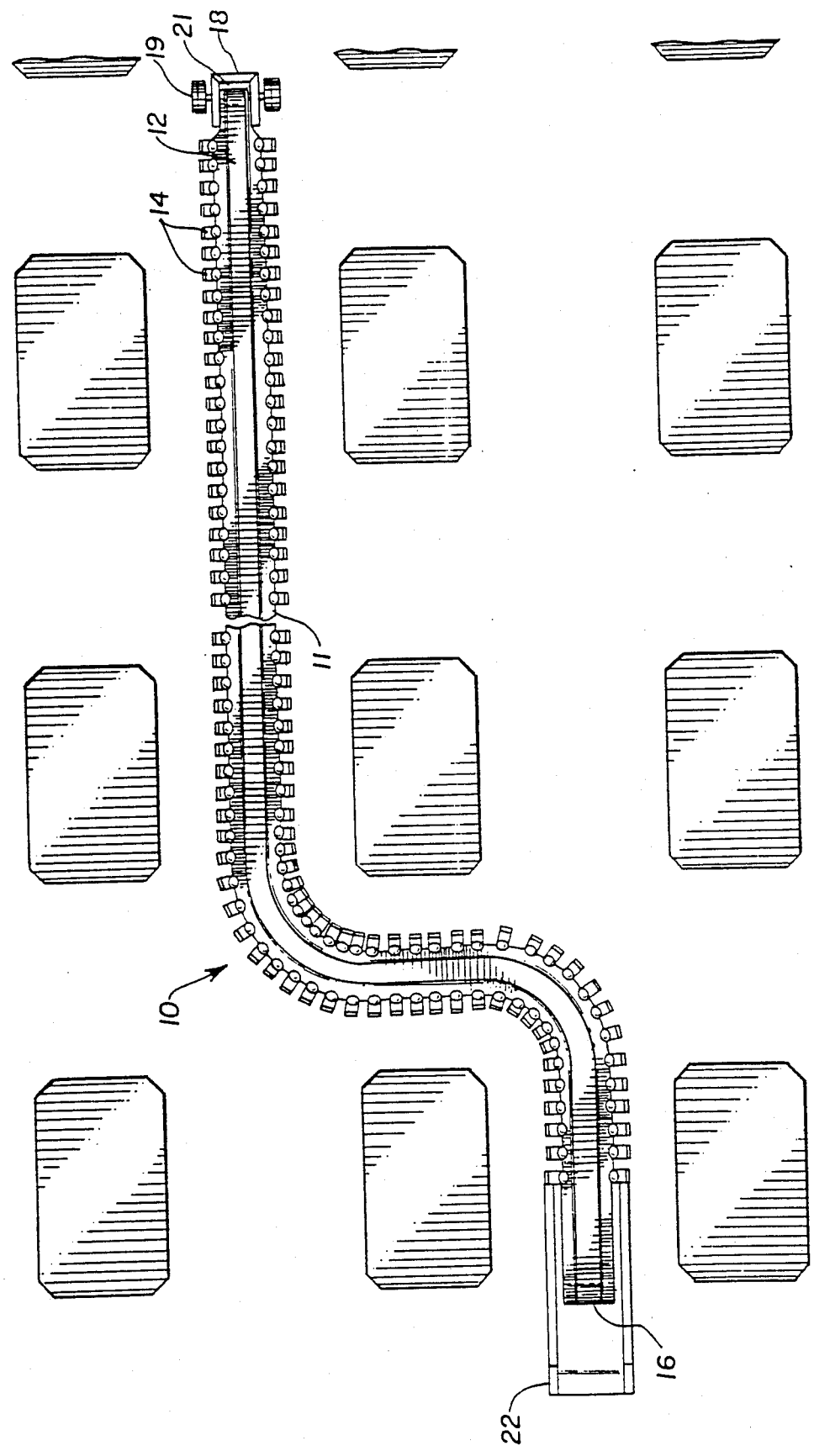
FIG. 1 is a diagramatic plan view of the conveyor system embodying the principles of the present invention.
Figure 7:
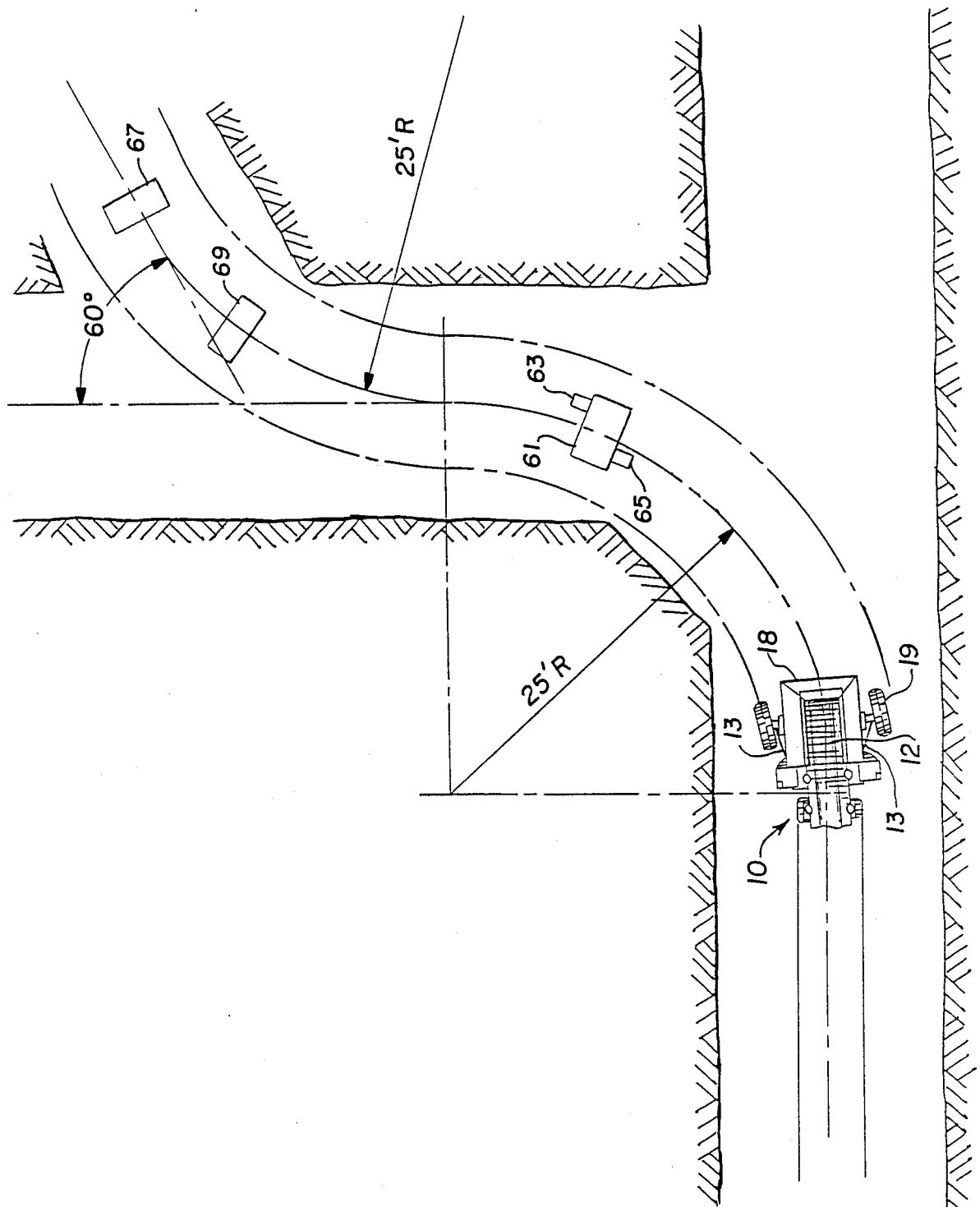
FIG. 7 shows a plan view of the advancing end of the conveyor system as it moves through a mine passageway.

Referring now to the drawings, and particularly to FIGS. 1 and 7, there is shown a conveying system having a mobile articulated conveyor which is adapted to be mounted above an endless crawler chain and which conveyor and crawler chain are capable of traversing curvilinear paths. This conveyor system is indicated generally by the numeral 10 and comprises the preferred embodiment of the present invention.

As is shown in FIGS. 1 and 7, the conveyor system 10 generally includes an articulated conveyor, generally denoted as 11, having an orbitally moveable conveying belt 12 supported by a train of framework members 14 interconnected in series which support the conveying belt 12 throughout the longitudinal extent of the train. In the preferred embodiment the train has a discharge end 16 and a material receiving end 18 at an end opposite the discharge end.

In the preferred embodiment, the receiving end 18 includes steering means, such as hydraulic cylinders 13, for directing the advancing conveyor train along an elongated path within the mine. Steering means may also be included at the discharge end 16 to steer the conveyor system 10 during retreat from the mine face.

Each framework member 14 further supports an orbitally moveable crawler chain assembly 20 (FIG. 3) located generally vertically below the conveyor belt 12.

As can be seen in FIG. 1, there is normally a stationary panel belt 22 located within the mine for receiving material discharged by the discharge 16 end of the conveyor system. Various methods and arrangements of the actual discharge of material from the conveyor belt 12 onto the panel belt 22 will be discussed in detail hereinafter.

For purposes of illustration only in the preferred embodiment the orbital conveying belt 12 is of the type originally disclosed in U.S. Pat. No. 4,387,801 to Merrill Hoover entitled "Conveyor Belt". The Hoover belt is a pre-controlled stretchable belt formed of a stretchable elastic material having the ability to be pre-stretched or elongated by up to 10% as to maintain tension within the belt when going around curves. It is necessary to control and limit the elongation of the belt and various methods have been proposed to limit the stretch of the belt. Such methods are generally disclosed in U.S. Pat. No. 4,282,971 to Harry R. Becker entitled, "Conveyor Belt Chain and Method for its Use" and U.S. Pat. No. 4,474,289 to Neal W. Densmore entitled, "Control Member for an Elongatable Conveyor Belt". The teachings of these patents are incorporated herein by reference.

FRAMEWORK MEMBERS

Figure 3:
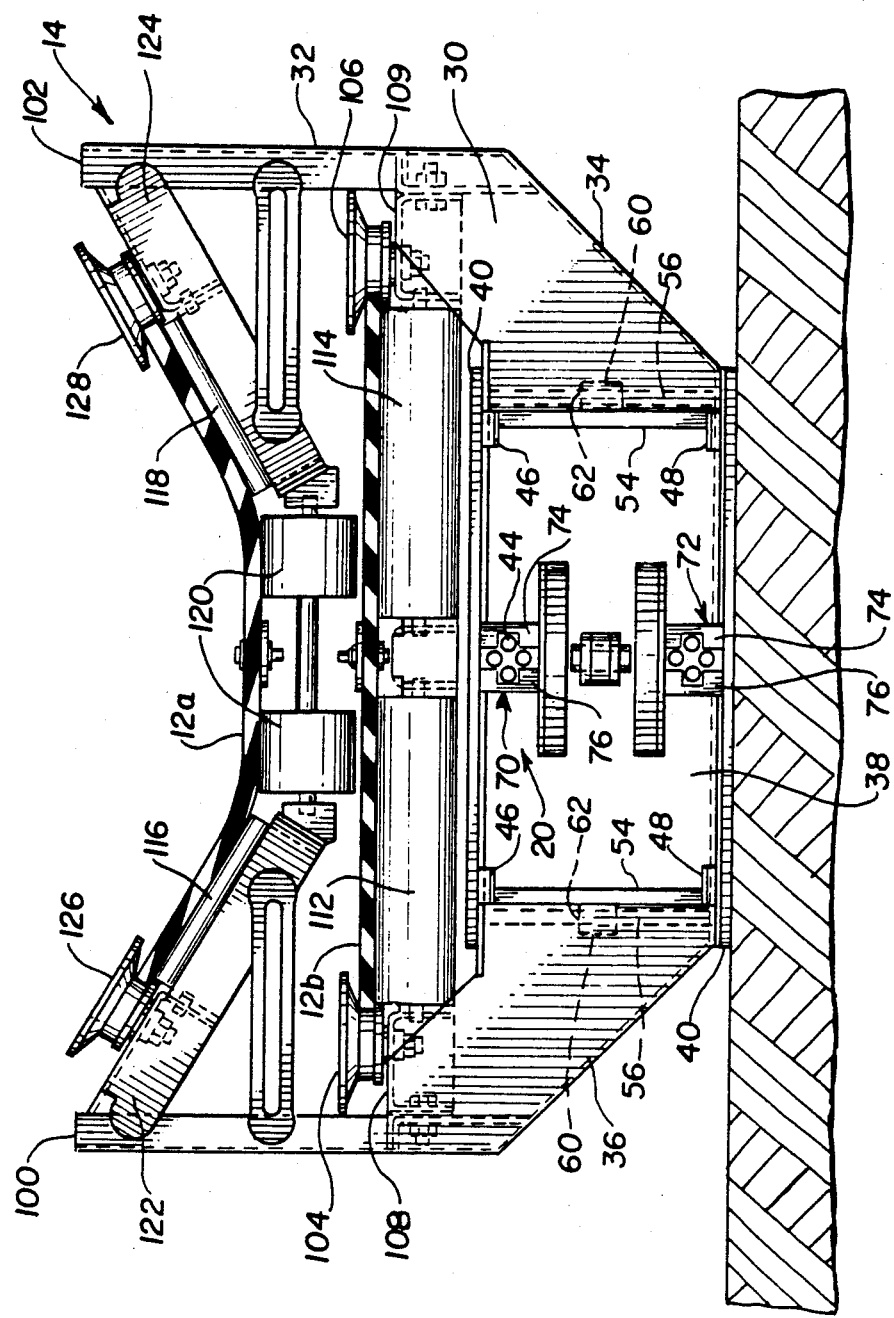
FIG. 3 is an enlarged sectional view of the framework member taken along the lines 3—3 of FIG. 2b.
Figure 4:
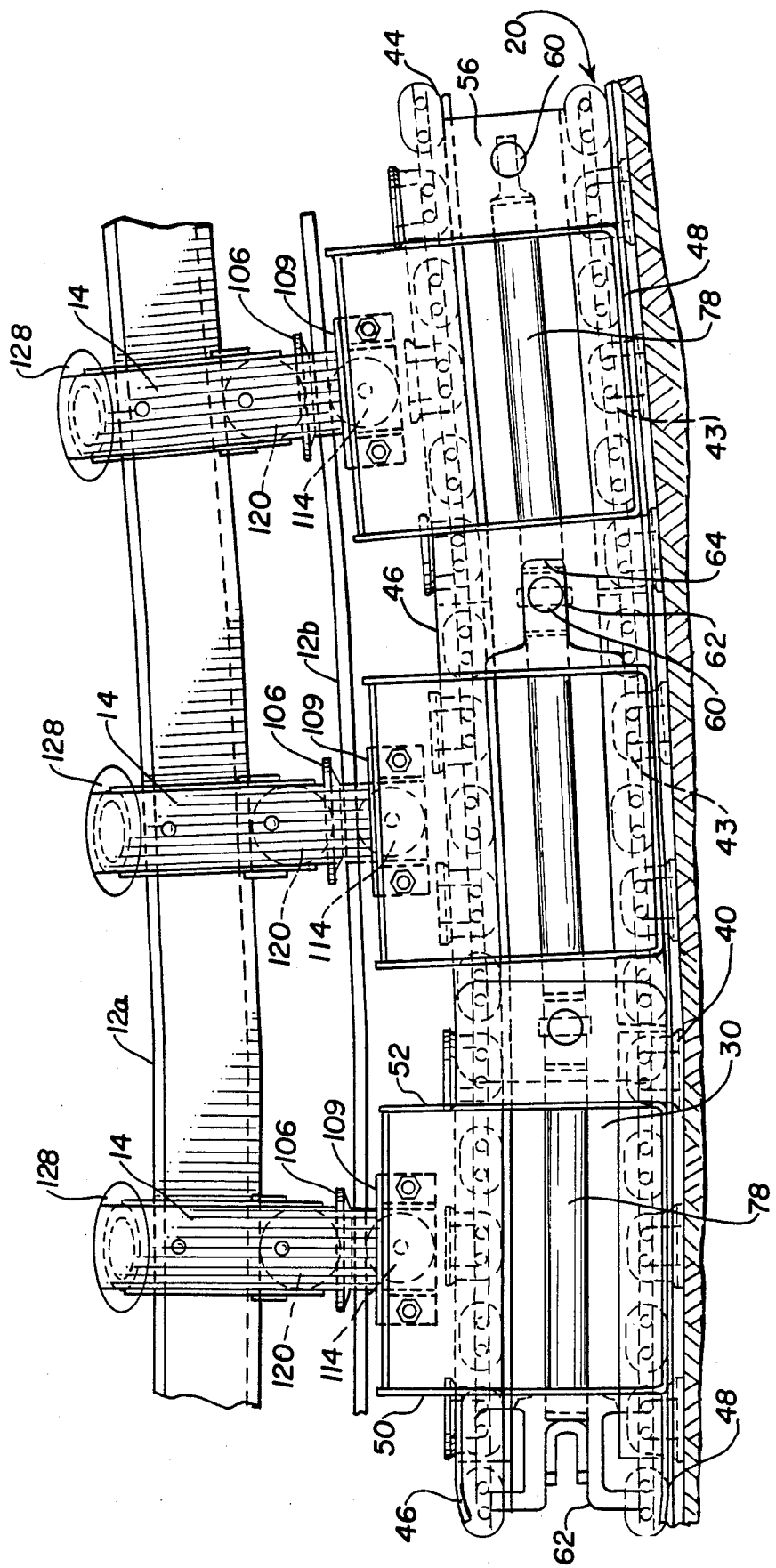
FIG. 4 is a side elevational view of the conveyor train of the present invention.
Figure 5:
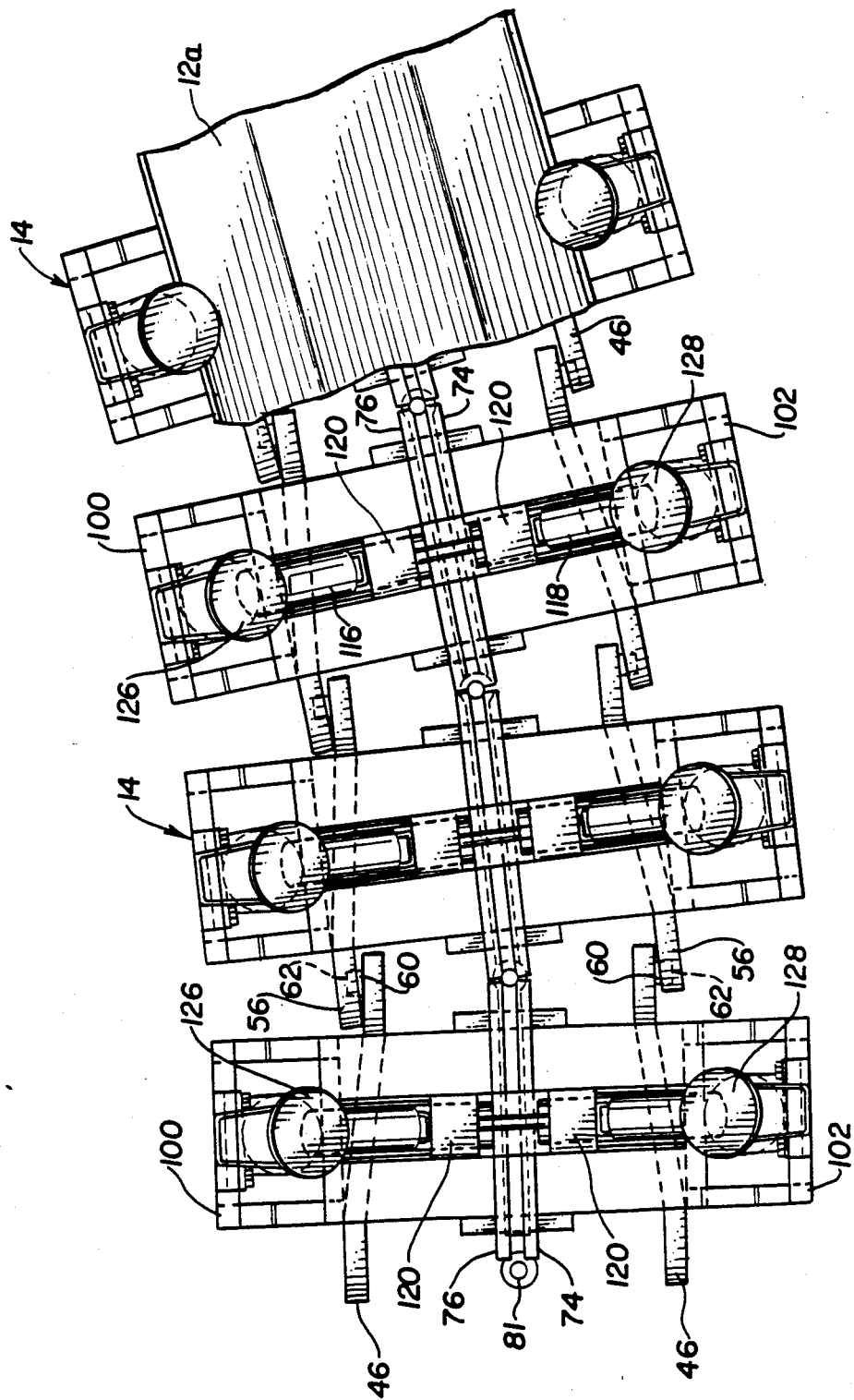
FIG. 5 is a plan view of the conveyor system of the present invention with the conveyor belt cut away.

As discuseed above, a plurality of framework members 14 are connected in series to form the elongated conveyor system 10. As can be seen in FIGS. 3, 4 and 5, each framework member 14 includes a bottom portion 30 which supports the crawler chain assembly 20 and, at predetermined intervals, the various drive components therefor. In addition, the bottom portion 30 of the framework member 14 supports an upper portion 32 which contains the support elements for the orbitally moveable conveyor belt 12.

In the preferred embodiment, the bottom portion 30 is composed of three sections. The two outer sections 34 and 36 serve to support the uppor portion 32. A central portion 38 is utilized to support and guide the upper and lower crawler pads 40 and the drive chain 44. The combination of the upper and lower crawler pads 40 and drive chain 44 make up the crawler chain assembly 20.

In the preferred embodiment, the crawler chain 44 is formed in an endless loop with each crawler pad 40, attached to the chain in series along the entire length of the conveyor train. In the preferred embodiment, each crawler pad 40 is attached to the chain 44 by means of a U-shaped member 43 welded to the under side of each pad. The links of chain 44 interact with the U-shaped member 43 when chain 44 is in tension to thereby move each crawler pad 40 along at the same speed as the drive chain 44.

Each bottom portion 30 supports a pair of top runners 46 and a pair of bottom runners 48. As can be best seen in FIG. 4, the runners 46 and 48 extend beyond the end portions 50 and 52 of the bottom portion 30. The runners 46 and 48 are supported by two pairs of stop plates 54 and 56. Each pair of stop plates 54 is welded to the end 50 of the bottom portion 30 on opposite sides of the central portion 38. Each support plate 56 is fixedly attached to the end 52 of bottom portion 30 adjacent the central portion 38 thereof. In the preferred embodiment, the runners 46 and 48 which are associated with end portions 50 and 52 are offset so that the upper and lower runners on adjacent framework members intermesh, thereby providing continuous support for the upper and lower crawler pads 40.

In addition, in the preferred embodiment, the stop plates 54 and 56 are adapted to interact with the adjacent stop plate 54 or 56 of the adjacent framework member to limit the side-to-side motion therebetween. The limitation of horizontal angular movement between adjacent framework members 14 is provided by a pin-and-slot arrangement which can be best seen in FIGS. 4 and 5. A pin 60 is fixed to stop plate 54 and is positioned to engage a slot 62 in stop plate 56. In the preferred embodiment, the pin and slot are arranged approximately equal distance from the top and bottom of stop plates 54 and 56.

In the preferred embodiment, when the framework members are aligned in a straight line, the pin 60 is centered within slot 62. When the conveyor train 10 negotiates a horizontal curve, the angular displacement in the horizontal plane between adjacent framework members 14 is limited, in either direction, by the pin 60 impinging on an end 64 of the slot 62. In the preferred embodiment, the permitted articulation between framework members 14 is approximately 5 degrees in either direction.

The above described pin-and-slot arrangement also limits the roll (about a longitudinal axis) allowed between adjacent framework members 14. This limiting function is controlled by the width of slot 62 versus the diameter of pin 60. The difference between the width of slot 62 and the diameter of pin 60 permits approximately 2-½ degrees of roll between adjacent framework members. In the preferred embodiment, this means that the difference between the width of the slot and the diameter of the slot is approximately one inch. This roll limitation is necessitated by the normal condition of the mine floor which is generally very uneven.

In the preferred embodiment, the central portion 38 of the bottom portion 30 is provided with chain guides generally denoted as 70 for the upper chain guide and 72 for the lower chain guide. Each chain guide 70, 72 is composed of a pair of identical guide members 74 and 76. In the preferred embodiment, each chain guide member 74, 76 extends beyond the end plates 50, 52 of the bottom portion 30 a sufficient distance to support the chain in the space between two adjacent framework members 14 and to act as a stop as described below. The preferred chain guides are of a cruciform shape so that alternate links of the chain 44 are maintained in parallel, but at right angles to the intermediately adjacent link. This structure positively entraps the chain keeping the links from either going upwards or sideways or twisting.

The central portion 38 additionally supports a longitudinally extending force transmission member 78. In the preferred embodiment, the force transmission member 78 is a tube which passes through end-plate members 50 and 52 and is fixedly supported thereby. As seen in FIGS. 3a and 3b, each end of tube 78 is provided with the necessary connection to form a universal type connection with each adjacent tubular member associated with an adjacent framework member 14. In the preferred embodiment, the tube 78 has a first end with a clevis-type arrangement 79 and a second end with a spherical ball joint arrangement 81. When the adjacent framework members 14 are interconnected as by pin 83, the opposite ends of the adjacent tube 78 are mated such that the clevis and ball joint are interconnected thereby forming a universal connection. This universal connection, of course, allows universal movement between adjacent framework members 14 and also transmits longitudinal forces (push and pull) between framework members.

The tubular member 78 may be made of telescoping parts (not shown) which may be extended to take up slack in both the belt 12 and the chain 44 as wear of these parts occurs. A pin arrangement would be used to lock the telescoping parts of member 78 in an extended position.

This movement is limited in the vertical direction by the chain guides 70 and 72. In the preferred embodiment, the chain guides extend within a predetermined distance of one another to limit the vertical angular displacement between adjacent framework members 14 to approximately 6 degrees. The 6-degree limit would determine the maximum angular displacement between framework members as the conveyor train moves up or down an inclined surface. As can easily be seen, the upper chain guide 70 would determine the limit when the conveyor is progressing along an upwardly sloped incline and the lower chain guide 72 would provide the limit when the conveyor is progressing downwardly along an incline.

In the preferred embodiment, the point of universal connection between ends 80 and 82 of tube 78 are in line both vertically and longitudinally with the pins 60 located on each of plates 54. This arrangement allows the limits on both the twisting and horizontal movement of the conveyor, as discussed above, to be independent of the vertical inclination between adjacent framework members (i.e. as the leading framework member 14 starts going up an incline).

As can be seen in FIGS. 3–5, each framework member 14 has an upper portion 32 constructed as to define an opening extending generally longitudinally throughout the conveyor train. Within this opening, each framework member 14 upper portion 32 includes mounting means for supporting an orbital belt within the open extent of the conveyor train. Since, as indicated above, all of the framework members 14 are identical, with the exception of the framework members which contain the drives for chain 44, only one will be discussed in detail. The chain drive system will be discussed in detail below.

As can be seen in FIG. 3, the upper portion 32 of each framework member 14 includes left and right conveyor belt support members 100 and 102. Support members 100 and 102 are bolted to the side portions 34 and 36 of the bottom portion 30. There exists a generally open area between member 100 and 102 directly above bottom portion 30.

A plurality of rollers comprise the means mounted on each framework member 14 for moveably supporting the orbital conveying belt 12 within the open area of the carriage train. An upper series of roller are provided for supporting the upper conveying run portion 12a of the belt 12 and a lower series of rollers are provided for supporting the lower run portion 12b of the belt 12.

Edge rollers 104 and 106 are mounted on brackets 108 and 109 respectively which are mounted across the bottom portion 30, thereby supporting edge rollers 104 and 106. The brackets 108, 109 are attached in any convenient manner to the end portions 34, 36 of bottom portion 30. In the preferred embodiment, a pair of belt support rollers 112 and 114 are also supported by and within brackets 108, 109.

In the preferred embodiment, the upper conveying run portion 12a of the belt 12 is supported by respective left and right troughing idlers 116 and 118 and a centrally-disposed dumbbell idler 120. As can be seen in FIG. 3, the troughing idlers 116 and 118 are disposed at a predetermined angle with respect to dumbbell idler 120 to give and maintain the upper conveying run 12a in a trough-shaped configuration. The troughing idlers 116 and 118 are maintained at this predetermined angle by a pair of support brackets 122 and 124.

For maintaining the upper conveying run portion 12a of the orbital belt 12 in an operative position on the troughing idlers 116 and 118 and the dumbbell idler 120, each framework member 14 is provided with a respective left and right upper edge idler 126 and 128. The edge idler 126 is supported on bracket 122 and the edge idler 128 is supported by bracket 124. As can be seen in FIG. 3, the left and right edge idlers 126, 128 rotate about an axis oriented generally perpendicular to the axis of rotation of troughing rollers 116 and 118. This orientation of the edge rollers provides rolling support for the edge of the belt and minimizes scuffing.

The dumbbell roller 120 is so formed to allow space for the stretch limiters (described in U.S. Pat. No. 4,474,289) that control the elongation of the belt. The edge rollers 104 and 106 perform the same function for the lower run of the belt 12b as do the edge rollers 126, 128.

In the preferred embodiment, the belt 12 is driven at each end of the elongated conveyor train by an electric motor and speed reducer (not shown). The details of this drive are taught in U.S. Pat. No. 4,339,031 in FIGS 21–23, and are incorporated herein by reference. It can be seen that there are any number of well-known methods for driving an orbital conveyor belt which could also be utilized in the present conveyor train.

In the preferred embodiment, the conveyor train is normally between 200 and 500 feet long, although any convenient length can be utilized as long as there is sufficient power to drive both the crawler chain and the conveyor belt. In the preferred embodiment, each framework member 14 has a length of approximately two feet, the length being in the direction of the longitudinal extent of the conveyor train and being measured between the centers of adjacent U-joint connections.

In the preferred embodiment, the crawler chain is driven by a series of interspersed framework members 14a containing drive means, the spacing of which is determined by mine conditions. Generally, the drive framework members 14a are spaced about 40 feet apart.

While there may be 10 or 12 drives in a 400 foot train, only one such drive containing framework member 14a will be described here.

As was discussed above, the crawler chain 20 is made up of a plurality of crawler pads 40 attached to the chain 44. In a typical 400 ft. long conveyor, the chain would be approximately 800 ft. long. In the preferred embodiment, the spacings between the centers of adjacent crawler pads 40 is approximately 12 inches with each crawler pad being a steel plate approximately 5-½ inches wide and ¼ inch thick. The framework member 14a containing the chain drive is structurally very similar to the framework members 14 described above so only the differences will be discussed. The main difference is that it contains a drive sprocket and the drive means necessary to drive the sprocket.

Figure 6:
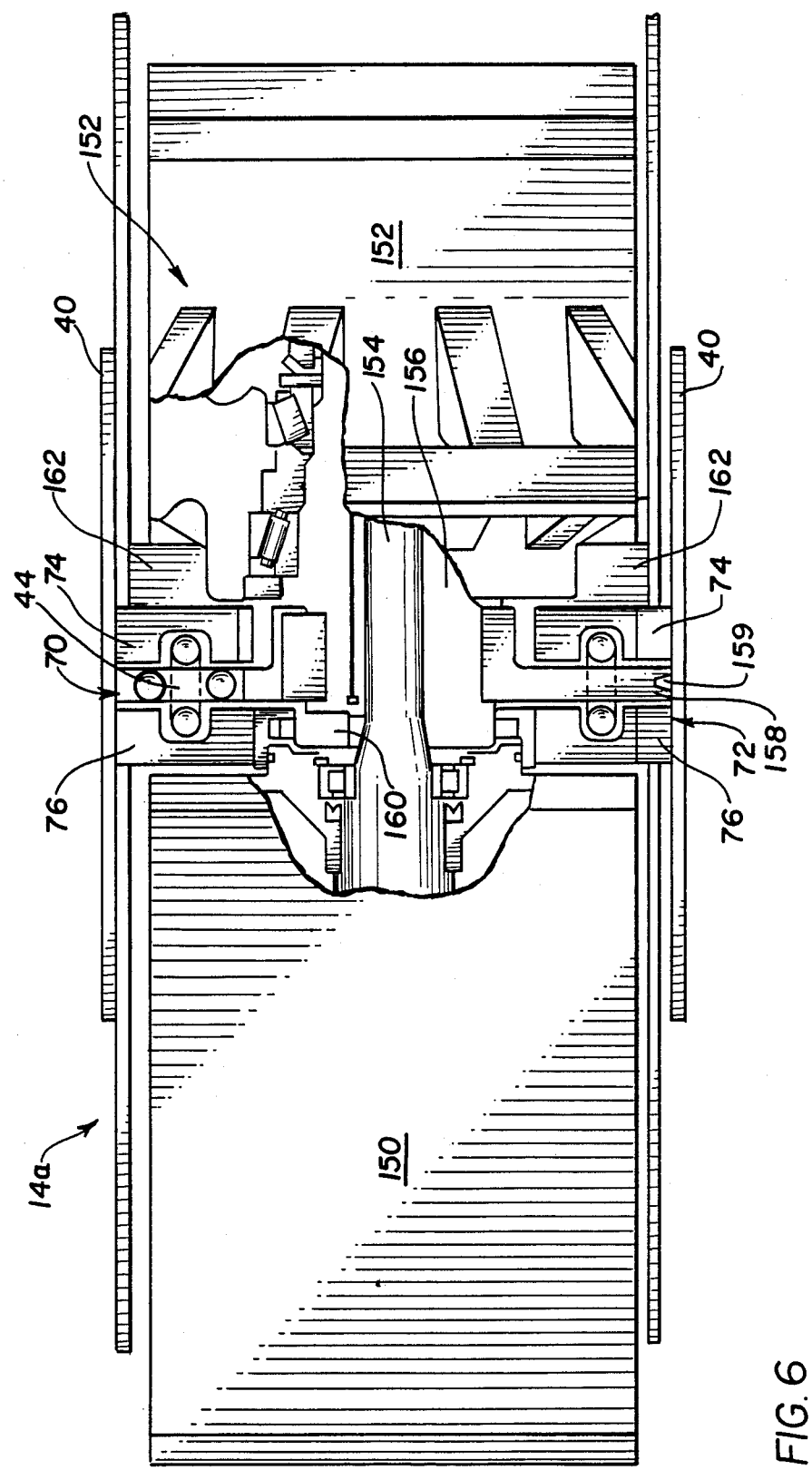
FIG. 6 is a cross-sectional view of the lower chain driven system of the present invention.

As can be seen in FIG. 6, the bottom portion 30 of the framework member 14a which contains a drive sprocket includes a motor 150 and a planetary gear assembly 152 interconnected by an input shaft 154. The planetary gear box 152 includes an output shaft 156 which drives a sprocket 158. While in the preferred embodiment the gear box 152 is a planetary drive assembly, any well-known gear speed-reducing assembly can be utilized to drive the sprocket.

In the preferred embodiment, the motor 150 is an alternating current electric motor having a power output of approximately 10 horsepower, however, it can be seen that any convenient power source such as hydraulic or pneumatic can be utilized.

As indicated above, the framework members 14a containing a drive unit are, in most respects, identical to the framework member 14 described above. It should be noted that the force transmission member 78 is removed and replaced by two plates 160 and 162. Plates 160 and 162 not only act as a force transmission member through the longitudinal axis extent of the framework member 14a, but also served to mount both the motor and gear reducer 150 and 152 respectively.

The universal connection points 79 and 81, on the framework members 14a are welded directly on end plates 50 and 52 rather than being attached to the ends 80, 82 of the force transmission member 78 as is the case in the other framework members 14. It should be noted, that in the preferred embodiment, the drive elements described above fit within the standard 2 ft. length utilized in the preferred framework members 14. However, the framework member 14a can be lengthened somewhat to accommodate different or larger drive elements.

Figure 8:
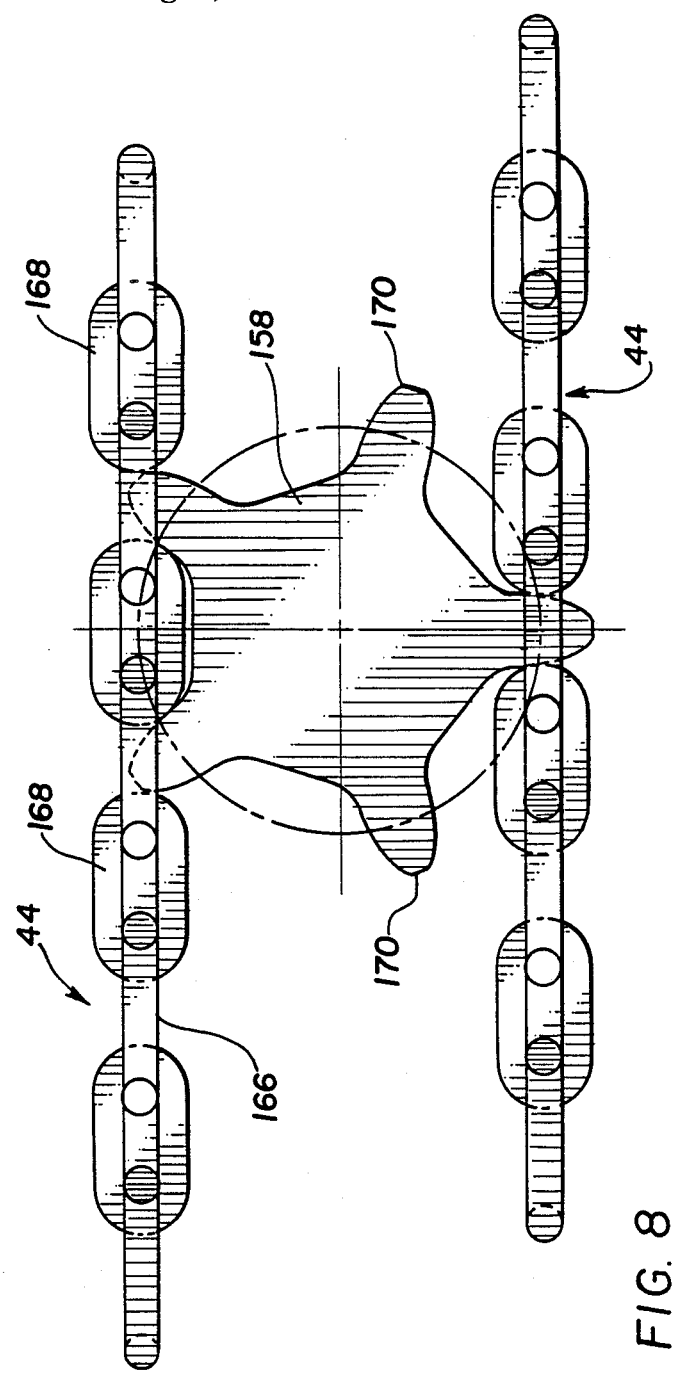
FIG. 8 shows the interaction between the drive sprocket and the crawler chain of the present invention.
Figure 9:
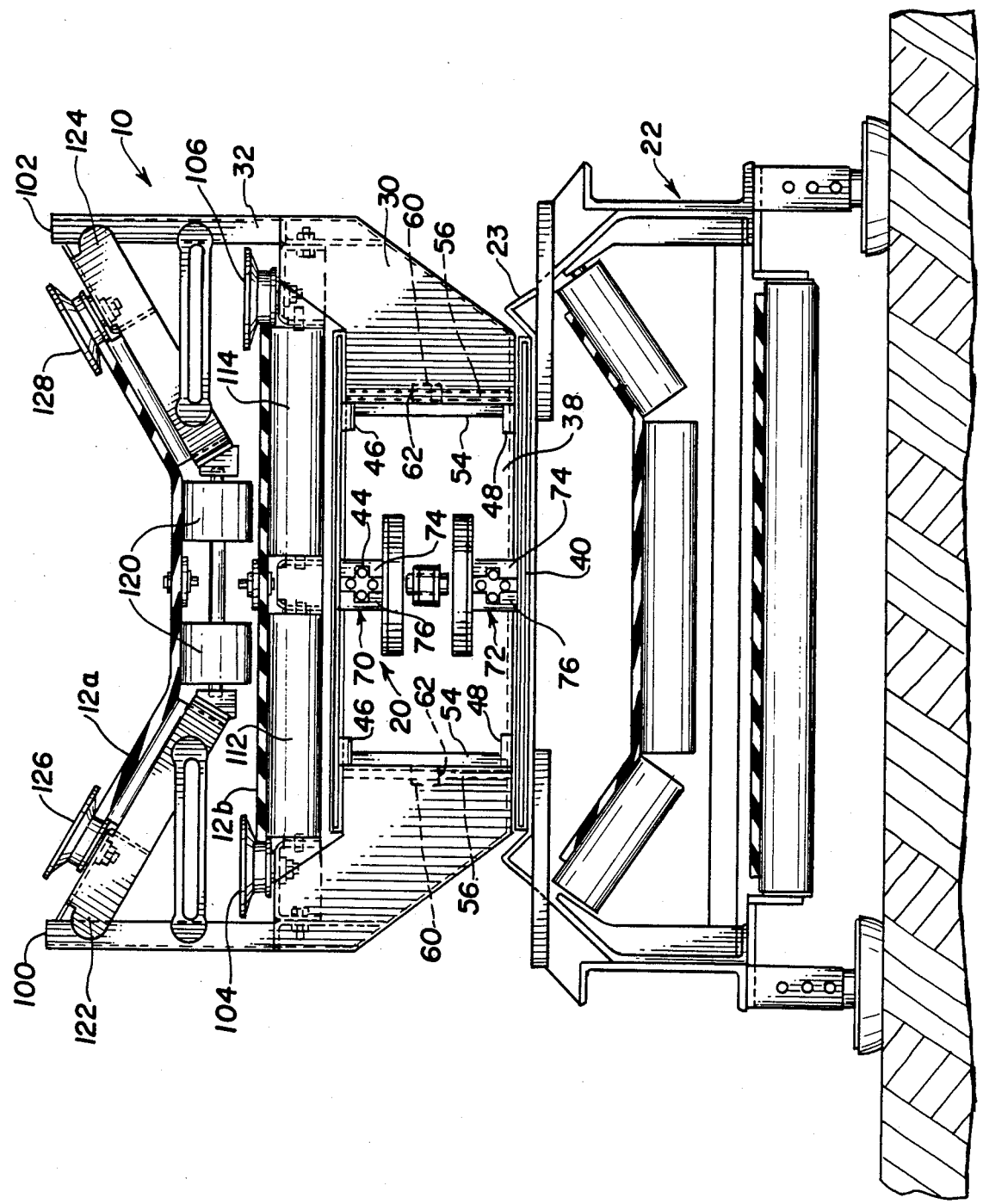

In the preferred embodiment as seen in FIG. 8, the chain 44 is an alternating pitch chain. This means that longer links 166 are interconnected with short links 168. Normally, the horizontally oriented links are the long links and the vertically oriented links are the short links. As can be seen in FIG. 6 and 8, the drive sprocket 158 fits in between the long links 166, but pushes against the edges of the vertical short links 168. As can be seen in FIG. 6, looking down on the sprocket 158, each tooth of the sprocket contains a concave indentation 159 which matches the convex outer surface of the vertical chain link 168. In the preferred embodiment, the sprocket 158 has five upstanding teeth and simultaneously drives both the upper and lower runs of chain 44 in a tangential manner. By this it it meant that there is no significant wrap of the chain around the circumference of the sprocket 158. It should be noted that the teeth 170 of sprocket 158 are in constant engagement with both the top and bottom run of chain 44 in that before one tooth disengages from the chain, the adjacent tooth is beginning its engagement with the links 168 of chain 44. In order to insure proper mating of each tooth 170 with each link 168 throughout the period of engagement therebetween, it is necessary to generate the profile of the tooth 170 from the incremental movement of the chain 44.

It should be noted that not every framework member 14 need have support structures for the belt 12 and the crawler system chain assembly 20 as long as sufficient support is provided by the framework members 14 which do have these structures. For simplicity, every framework member of the preferred embodiment has such support members.

It should also be noted that a take up system (as shown in FIG. 2 of U.S. Pat. No. 4,339,031) may be utilized at each end 16 and 18 of the conveyor system 10 to maintain proper tension in the elongatable belt 12. A similar tensioning system can be used to maintain proper tension in the chain 44 as wear occurs between the links thereof.

OPERATION

FIG. 7 discloses a typical application of the conveying system 10 as taught herein. In the preferred embodiment, the input end 18 is capable of advancing around curvilinear paths within a room-and-pillar type coal mine. In the preferred embodiment, the curvilinear paths have radii of curvature of approximately 25 feet. This allows the use of 60 degree cross cuts which are typical in many mines. It is, of course, advantageous to minimize the radius of a curvature of the articulated conveyor system 10 to permit tighter turns.

It is envisioned that the conveying system 10 as taught herein will provide a mobile conveying system which can simultaneously convey material from the input end 18 to the discharge ends 16 while advancing on the crawler system as described above, through an elongated path in an underground mine. In general, it is envisioned that the input end 18 would be steerable in some fashion as by wheels, 19, shown in FIG. 1, to follow the output of a continuous mining machine 61, including a loading means 63 for gathering mined material off of a mine floor and means 65 for discharging material gathered by the loading means for example, or a mobile mineral feeder crusher car 67 or even a mineral loading machine 69.

In order to facilitate loading the end 18 may be equipped with a hopper-like framework member 21 which would include the conveyor belt 12 drive system. As can be seen from the above description, the conveying system can continuously convey the material received from any of these mining machines while at the same time advancing or retreating.

For purposes of explanation only, the operation of the conveying system as it would occur following a continuous mining machine shall be described.

A typical continuous mining machine has a discharge conveyor which is articulated and can be swung from side to side as it discharges material. In the preferred embodiment, the conveying system 10 would utilize a hopper 21 on the receiving end 18 of the conveyor. The continuous conveyor belt 12 would extend a predetermined distance within the hopper to insure gathering and transporting together all the material deposited by the continuous mining machine.

As discussed above, discharge end 16 of the conveyor system 10 overlaps the mine panel belt 22. As can be seen, FIGS. 10, 11, 12 and 13 shows various methods or arrangements for this discharge and will be described below in more detail.

In a typical mining situation, the conveyor system 10 would, as indicated above, extend for approximately 200-500 ft. with, at least initially, the majority of the conveying system positioned over the panel belt 22. As the continuous mining machine advances into the mine face, the crawler chain drive system would propel or advance the conveyor 10 along with the advance of the continuous mining machine so that the hopper 21 of input end 18 is always positioned to receive the discharge from the rear discharge conveyor of the mining machine. The path that the conveyor system 10 follows is that path delineated by the steerable input end 18. Should the continuous mining machine cut a corner to form a cross-cut, the conveyor system 10 would turn in a like manner to follow the continuous mining machine. The crawler system inherently maintains the position of the entire conveying system along the path delineated by the input end 18 since only the upper pads of the crawler chain move with respect to the ground. The lower strand of crawler pads maintains the shape of the elongated path since these pads are substantially fixed as the conveying system 10 advances (at least up to the point where the discharge end 16 and the last framework member 14 would engage the ground). However, during normal function of the conveyor train, this point of advance would never occur since the panel belt 22 would then have to be extended in order to insure the conveying of mined materials discharged from the conveyor 10.

It can be seen, however, that if one were to tram the conveying system through the mine, such as when one would want to move the conveying system from one section of the mine to another, then the last framework member 14 would represent the point where the last crawler pad would be picked up off the ground and the first framework member 14 adjacent end 18 would always represent the point where the crawler pad 40 is first laid on the mine surface. All the intermediate crawler pads in contact with the mine floor would remain substantially stationary while the conveyor train advances until the trailing end of the conveyor system picks up the pad 40. Conversely, the conveyor pads 40 of the upper run are in continuous motion until they are laid down by the leading end of the conveyor. As can be seen, the path or track formed by the crawler chain is as fixed as if there were rails laid on the mine floor. The advantages of the mobile conveying system taught herein when compared to a mobile conveying system utilizing wheels should be obvious. When a conveyor system utilizing wheels is used, there is nothing to constrain the conveyor to a fixed path as it advances. This is especially so when a wheel conveying system goes around a curve.

While the preferred crawler chain extends substantially throughout the longitudinal extent of the conveyor train it would of course be possible to utilize two or mroe closed loop or endless crawler chain assemblies 20 in series to support the endless orbital conveyor belt 12. When two or more crawler chains are used over the 300 foot to 500 foot conveyor train length each would have the same structural design and exhibit the same flexibility and other characteristics as described in the single crawler chain assembly 20.

DISCHARGE

Figure 2A:
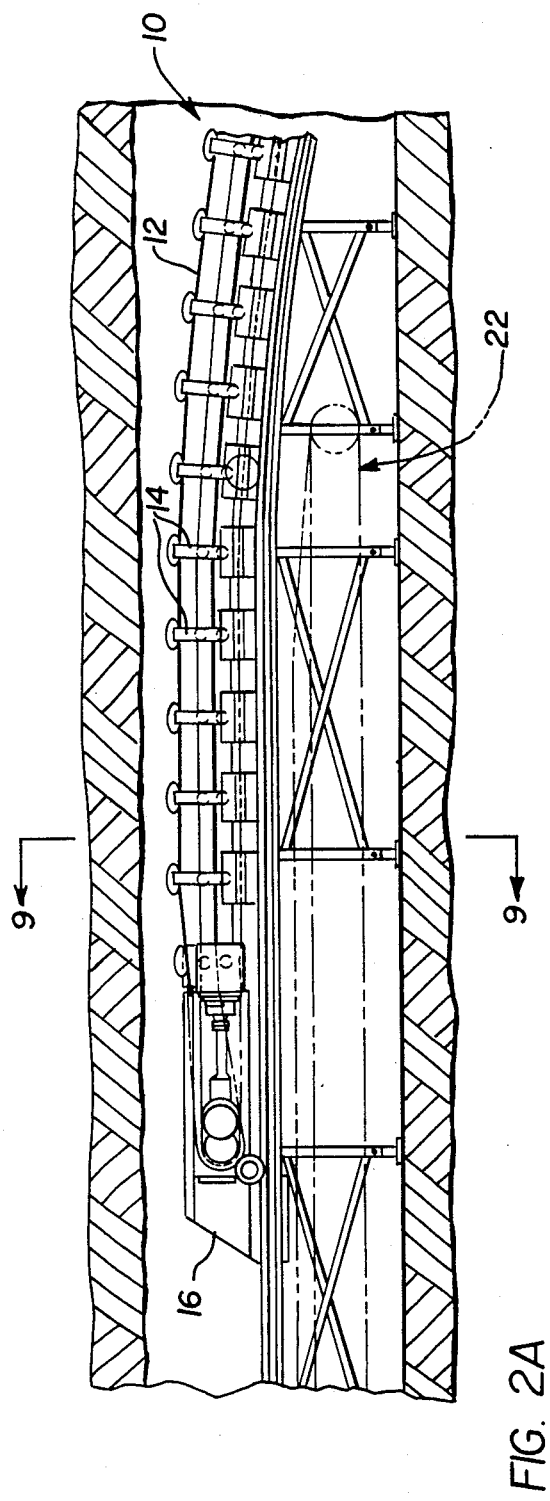
FIG. 2a is a fragmentary side elevational view of the discharge end of the conveyor system.
Figure 2B:
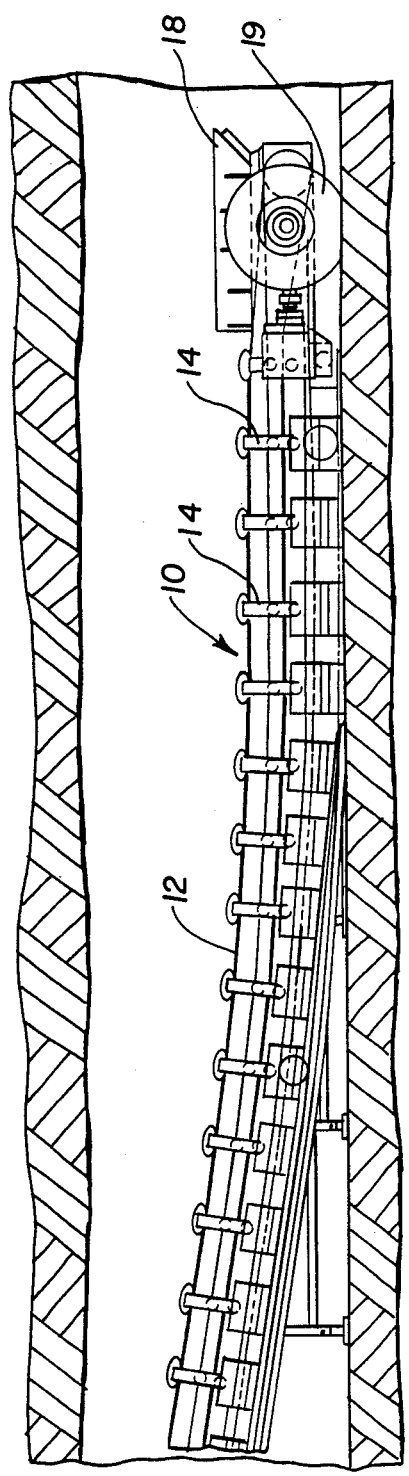
FIG. 2b is a fragmentary side elevational view of the input end of the conveyor system.

FIGS. 9–12 disclose various methods of supporting the conveying system 10 of present invention over the standard panel belt 22 which is fixed with respect to the mine passageways in order to discharge material therefrom. As can be seen in FIGS. 2a and 2b, the conveying system 10 of the present invention is initially located so that a longer portion of the conveying system 10 is supported over the panel belt 22. In the preferred embodiment, there are guide means 23 such as welded angles, on either side of the crawler pads 40 which serve to keep the conveying system 10 aligned vertically above the panel belt 22. Note that the panel belt 22 is well-known in the mining art and can be of any suitable type conveyor and is not described herein in detail.

In addition, any suitable guide means 23 can be utilized to insure that the discharge end 16 of the conveying system 10 is maintained in proper alignment over the panel belt 22.

Figure 10:
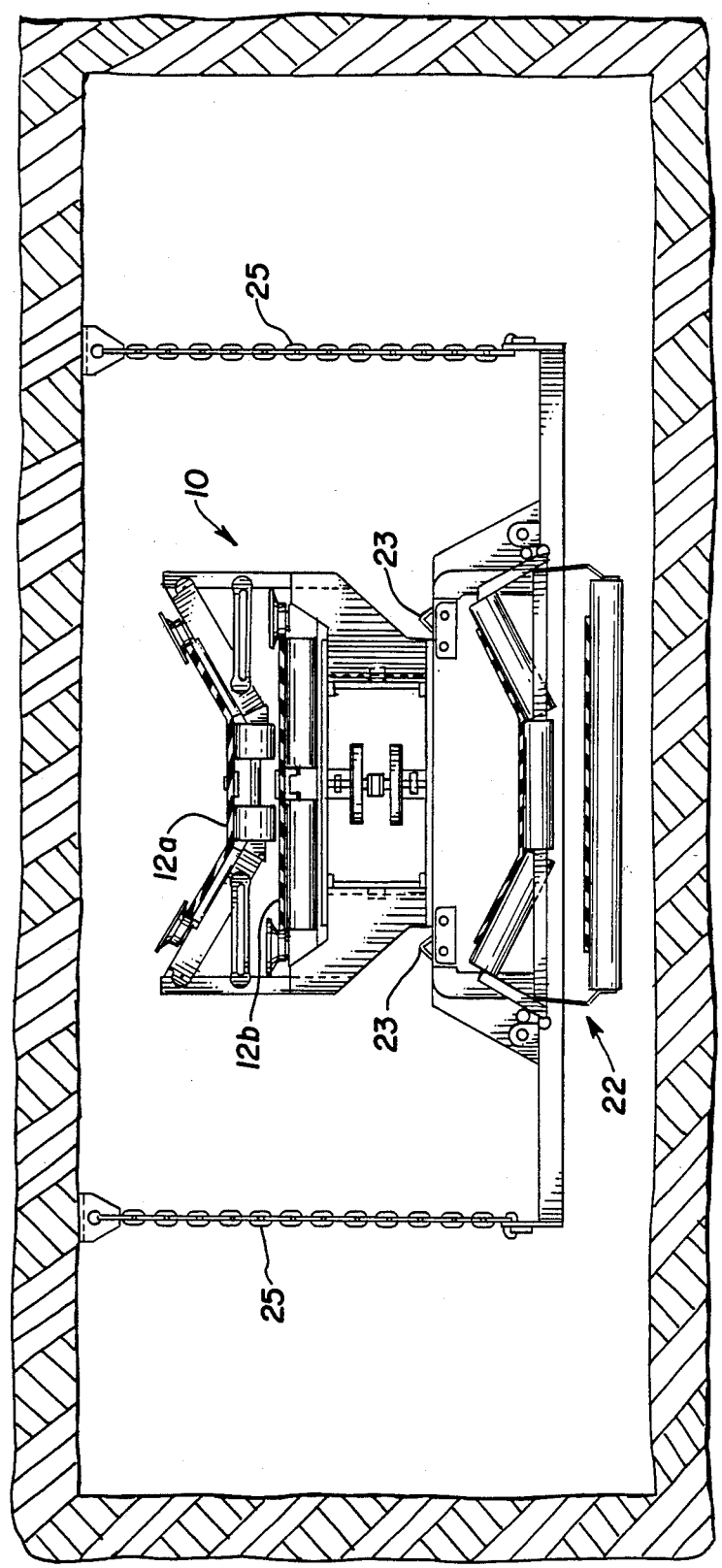
FIG. 10 shows an alternate discharge scheme for the conveyor train of the present invention.

FIG. 10 discloses a discharge system very similar to that described above in FIG. 9 with the exception that the panel belt 22 and the discharge end 16 of the conveyor system 10 are suspended by chains 25 from the mine roof.

Figure 12:
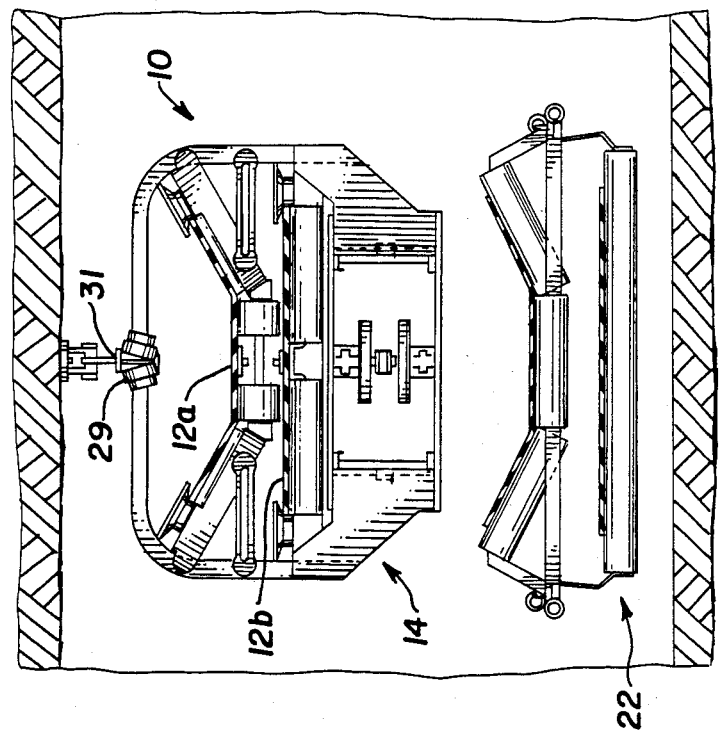
FIG. 12 shows still another alternate discharge scheme for the conveyor system of the present invention.
Figure 11:
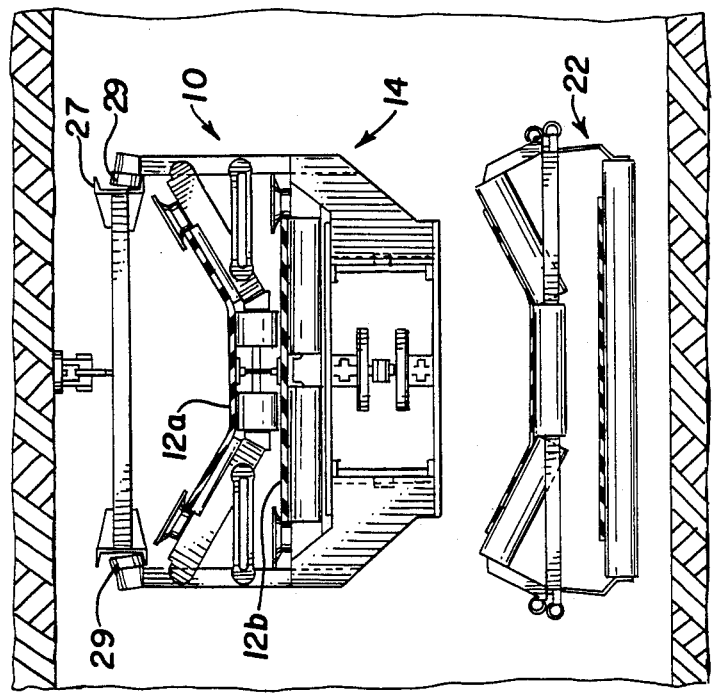
FIG. 11 shows yet an additional discharge scheme for the conveyor system of the present invention.

FIGS. 11 and 12 disclose alternate guiding means replacing the angled guiding means 23 for insuring that the discharge end 16 of the conveying system 10 is maintained directly over the panel belt 22. As can be seen in FIG. 11, a pair of channel members 27 form an overhead rail system suspended from the mine roof. Each framework member 14 is then equipped with a pair of rollers 29 which engage the channel members and maintain the path of the discharge end 16 during the portion of travel in which the conveyor system 10 is over the panel belt 22.

FIG. 12 discloses a similar arrangement with the difference being that an I-beam 31 is suspended from the mine roof and the rollers 29 attached to each framework member 14 are centrally located above the elastomeric conveyor belt 12.

It can be seen that a standard cutter or loading device can be integrally attached to the advancing end of the conveyor system 10 to be advanced toward the mine face by the operation of crawler chain or track assembly 20. The conveying system then would become an elongated cutting and/or loading and conveying system.

I claim:

1. A material conveyor structure capable of traversing a surface along an elongated path, said structure comprising:
   framework members arranged in tandem on said surface along said elongated path;
   connector means on said framework members cooperable with connector means on an adjacent framework member for coupling of said framework members to form an elongated train;
   a first plurality of said framework members including means for supporting orbitally moveable crawler chain means in engagement with said surface, said chain means capable of propelling said conveyor structure along said surface, said orbitally moveable crawler chain means extending continuously throughout said first plurality of framework members along the longitudinal extent of said train; and
   a second plurality of said framework members including means for supporting orbitally moveable conveying means above said orbitally moveable crawler chain means, the conveying run of said orbitally moveable conveying means operable to convey material substantially throughout the longitudinal extent of said train.

2. A material conveyor structure as set forth in claim 1 wherein at least one of said framework members of said first plurality supports drive means for said orbitally moveable crawler chain means.

3. A material conveyor structure set forth in claim 1 wherein at least one of said framework members of said second plurality supports means for driving said orbitally moveable conveyor belt.

4. A material conveying system as set forth in claim 1 wherein said connector means includes means for permitting universal-type movement between adjacent framework members.

5. A conveyor structure as set forth in claim 4 wherein said connector means includes means to limit the relative universal movement between said framework members.

6. A conveyor structure as set forth in claim 2 wherein each of said drive means includes a drive sprocket capable of engaging and driving both the upper and lower strands of said orbitally moveable crawler chain to thereby propel said conveyor structure along said surface.

7. A material conveyor structure as set forth in claim 5 wherein each framework member connector means includes means for limiting the articulation between said framework member and each adjacent framework member in the horizontal, vertical and longitudinal directions.

8. A material conveyor structure as set forth in claim 1 wherein said orbitally moveable conveying means is an endless belt formed from elongatable elastomeric material.

9. A self-propelled material conveying system capable of traversing a surface along an elongated path having at least one curvilinear portion, said conveyor system comprising:
 a plurality of framework members arranged in tandem on said surface along a portion of said elongated path to form an elongated conveyor train;
 connector means on each framework member cooperable with connector means on each adjacent framework member for coupling said plurality of framework members, said connector means permitting universal type movement between adjacent framework members;
 a first plurality of said framework members including means for supporting orbitally moveable crawler chain means in engagement with said surface, said crawler chain means extending continuously throughout said first plurality of framework members along the longitudinal extent of said train, said crawler chain means capable of lateral movement along said elongated path;
 a second plurality of said framework members including means for supporting an orbitally moveable conveyor belt above said orbitally moveable crawler chain means, the conveying run of said orbitally moveable conveyor belt operable to convey material throughout the longitudinal extent of said train;
 means for driving said orbitally moveable crawler chain means to thereby propel said material conveying system along said elongated path on said surface;
 means for steering at least one end of said material conveying system to delineate said elongated path whereby each framework member follows, in series, said elongated path delineated by said at least one end as said material conveying system advances or retracts; and
 means for driving said orbitally moveable conveyor belt independent of the movement of said crawler chain means thereby allowing conveyance of material either while said material conveying system is stationary or as said material conveying system advances or retracts.

10. A material conveyor structure as set forth in claim 9 wherein said crawler chain means comprises a series of crawler pads interconnected by chain links to form an endless loop.

11. A material conveyor structure as set forth in claim 9 wherein at least one of said framework members in said first plurality of framework members supports said means for driving said orbitally moveable crawler chain means, said means for driving being independent of said means for driving said conveyor belt.

12. A material conveyor structure set forth in claim 9 wherein at least one of said framework members in said second plurality of framework members supports said means for driving said orbitally moveable conveyor belt.

13. A conveyor structure as set forth in claim 9 wherein said connector means includes means to limit the relative universal movement between said framework members.

14. A conveyor structure as set forth in claim 11 wherein each of said means for driving includes a drive sprocket capable of engaging and driving both the upper and lower strands of said orbitally moveable crawler chain means to thereby propel said conveyor structure along said surface.

15. A material conveyor structure as set forth in claim 9 wherein each framework member includes means for limiting the articulation between said framework member and each adjacent framework member in the horizontal, vertical and longitudinal directions.

16. A self-propelled material conveying system as set forth in claim 9 wherein said means for steering said at least one end comprises steering wheels coupled to a material receiving or discharging framework member located at said at least one end of said conveying system.

17. A self-propelled material conveying system as set forth in claim 9 wherein said means for steering comprises hydraulic cylinders attached to said framework members adjacent said at least one end, said hydraulic cylinders capable of moving said framework members transverse to said elongated path.

18. A method for conveying material being discharged from a mining machine of the type capable of advancing along a mine surface into a mine face, comprising the steps of:
 supporting an orbitally moveable conveyor means on a series of framework members, said conveyor means extending substantially throughout the entire length of said conveyor train;
 connecting a series of said framework members to form a conveyor train;
 supporting orbitally moveable crawler chain means capable of engaging the mine surface on said framework members vertically below said orbitally moveable conveyor means, said crawler chain extending continuously substantially throughout a first plurality of framework members along the length of said conveyor train, said crawler chain means capable of flexing in a lateral direction;
 advancing said conveyor system as said mining machine advances by driving said orbitally moveable crawler chain means;
 steering said conveyor system to follow the material discharge of said mining machine as said mining machine advances into said face whereby said crawler chain means flexes laterally to follow said discharge; and
 driving said orbitally moveable conveying means independently of the movement of said crawler chain means to thereby allow conveyance of said discharged mined material either while said conveyor system is stationary or in motion along said mine surface.

19. A mined material-loading system comprising:
 a mining machine, including a loading means for gathering mined material off a mine floor and having a means for discharging material gathered by said loading means;

a plurality of framework members connected to and arranged in tandem behind said mining machine to form an elongated conveyor train;

connector means on each framework member for coupling said plurality of framework members, said connector means permitting universal type movement between adjacent framework members;

a first plurality of said framework members including means for supporting orbitally moveable crawler chain means in engagement with said surface, said crawler chain means extending continuously throughout said first plurality of framework members along the longitudinal extent of said train, said crawler chain means capable of flexing in at least the lateral direction perpendicular to the longitudinal extent thereof;

said framework members including means for supporting an orbitally moveable conveying means above said orbitally moveable crawler chain means, the conveying run of said orbitally moveable conveyor means operable to receive said material substantially throughout the longitudinal extent of said train;

means for steering said loading means along a mine surface to allow gathering of mined material along straight or curvilinear paths;

means for driving said orbitally moveable crawler chain means to thereby propel said conveyor train, said conveyor train being movable in proximity to said mining machine along said mine surface;

means for transferring material discharged from said means for discharing to said conveying means; and means for driving said orbitally moveable conveying means independent of the movement of said crawler chain means to thereby allow conveyance of material either while the conveyor train is moving along said mine surface of is stationary.

20. A mining system comprising:
a mineral cutter, including a mineral cutting means and having a means for discharging material cut by said cutter means;

a plurality of framework members connected to and arranged in tandem behind said cutter to form an elongated conveyor train;

connector means on each framework member for coupling said plurality of framework members, said connector means permitting universal type movement between adjacent framework members;

said framework members including means for supporting orbitally moveable flexible crawler chain means in engagement with a mine surface, said crawler chain means extending continuously throughout at least some of said framework members along the longitudinal extent of said train and being capable of flexing in at least the lateral direction;

said framework members including means for supporting an orbitally moveable conveying means above said orbitally moveable crawler chain means, the conveying run of said orbitally moveable conveyor means operable to receive said material from said discharge means and to convey said material substantially throughout the longitudinal extent of said train;

each of said orbitally moveable conveying means and said orbitally moveable crawler chain means capable of traversing a curvilinear path by flexing in said lateral direction;

means for steering said cutter into a mine face to allow cutting of straight or curvilinear paths;

means for driving said orbitally moveable crawler chain means to thereby propel said conveyor train in proximity to said discharge means; and means for driving said orbitally moveable conveying means independent of the movement of said crawler chain to thereby allow conveyance of material either while the cutter means and conveyor train are moving along said mine face or are stationary.

21. A mining system as set forth in claim 20 wherein said crawler chain and therefore each of said framework members follow, in series, the path delineated by said mineral cutter as said cutter advances into said mine face.

22. A material conveyor structure capable of traversing a surface along an elongated path having at least one curvilinear portion, said structure comprising:
a plurality of framework members arranged in tandem on said surface along said elongated path;

connector means on each framework member cooperable with connector means on each adjacent framework member for coupling said plurality of framework members to form an elongated train;

a first plurality of said framework members including means for supporting orbitally moveable flexible crawler chain means in engagement with said surface, said orbitally moveable crawler chain means extending continuously substantially throughout the longitudinal extent of said first plurality of framework members;

said framework members including for supporting orbitally moveable conveying means above said orbitally-moveable crawler chain means, the conveying run of said orbitally moveable conveyor means operable to convey material substantially throughout the longitudinal extent of said train; and each of said conveying means and said crawler chains being capable of flexing laterally and traversing a curvilinear path.

23. A method for conveying material being discharged from a mining machine onto a conveyor train formed of a series of framework members supporting an orbitally moveable crawler chain having pads and extending continuously substantially throughout the longitudinal extent of said conveyor train and which chain is capable of engaging a mine surface and flexing in at least the lateral direction along said surface, and which series of framework members also support an orbitally moveable conveying means vertically above said crawler chain, said conveying means also extending substantially throughout the longitudinal extent of said conveyor train, comprising the steps of:
advancing said conveyor system as said mining machine advances by driving said orbitally moveable crawler chain;

steering one end of said conveyor system as said moveable crawler chain is driven to follow the material discharge of said mining machine as said mining machine advances into said face and to receive said material discharge, whereby the pads of said crawler chain flex in the lateral direction to follow, in series, the path delineated by said one end; and driving said orbitally moveable conveying means independently of the movement of said crawler chain to thereby allow conveyance of said discharged mined material either while said conveying system is stationary or in motion along said mine surface.

24. The material conveyor structure of claim 1 wherein said second plurality of framework members includes said first plurality of framework members and additional framework members.

25. The material conveyor structure of claim 1 wherein said second plurality of framework members is the same framework members as said first plurality of framework members.

* * * * *

UNITED STATES PATENT AND TRADEMARK OFFICE
CERTIFICATE OF CORRECTION

PATENT NO. : 4,852,724

DATED : August 1, 1989

INVENTOR(S) : Theodore B. Bodimer

It is certified that error appears in the above-identified patent and that said Letters Patent is hereby corrected as shown below:

Col. 4, line 68, cancel "conveyor" and substitute therefor --conveying--.

Col. 11, line 39, cancel "mroe" and substitute therefor --more--.

Col. 15, line 39, cancel "of" and substitute therefor --or--.

Signed and Sealed this

Seventeenth Day of July, 1990

Attest:

HARRY F. MANBECK, JR.

*Attesting Officer*   *Commissioner of Patents and Trademarks*